D. A. JOHNSON.
Thill Coupling.

No. 113,525.  Patented April 11, 1871.

Witnesses.  Inventor.

United States Patent Office.

DANIEL A. JOHNSON, OF BOSTON, MASSACHUSETTS.

Letters Patent No. 113,525, dated April 11, 1871.

IMPROVEMENT IN THILL-COUPLINGS.

The Schedule referred to in these Letters Patent and making part of the same.

I, DANIEL A. JOHNSON, of Boston, in the county of Suffolk and State of Massachusetts, have invented certain Improvements in Adjustable Clips, of which the following is a specification.

Figure 1:
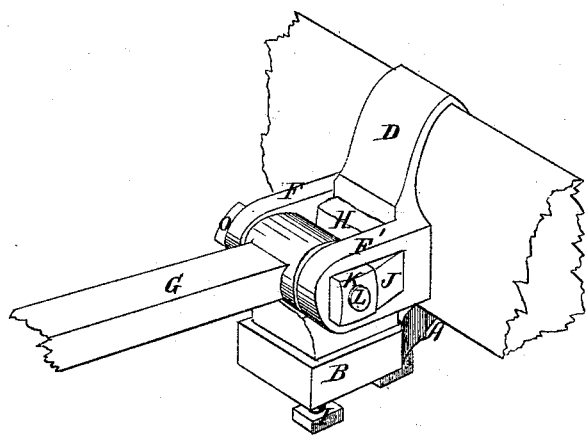
Figure 2:
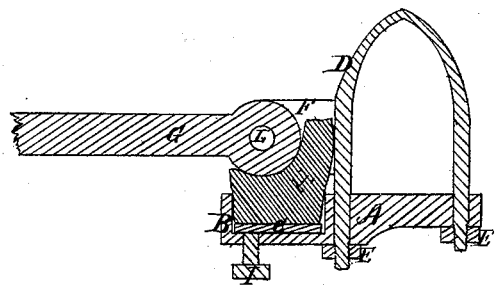

Figure 1 is a perspective view of my invention, and Figure 2, a longitudinal vertical central section.

This invention relates to that class of carriage-clips which employs elastic packing to prevent rattling of the thill-coupling; and It consists mainly of certain devices for adjusting and regulating the pressure of said packing, and also of a device for holding the nut of the bolt which couples the thill, all of which will be more fully described hereinafter.

In the drawing—

A represents the yoke of the clip, the forward part of which is provided with a socket, B, in which is located a loose plate, C.

D represents the band which surrounds the axle, the ends of which band pass through the rear portion of the yoke A, and are secured thereto by nuts E.

F F' represent lugs projecting from the band D above the socket B, between which lugs is pivoted the thill G.

H represents a packing of rubber, which rests in socket B, on the loose plate C, between lugs F F', and projects upward behind the thill, being provided with a concavity which fits the circular end of said thill.

I represents a set-screw, which enters the bottom of socket B and bears against the loose plate C.

J represents a projection on the outer side of the lug F', which projection holds the nut K of the coupling-bolt L and prevents the same from turning.

Operation.

The end of thill G is placed in position between the lugs F, and the bolt L is introduced and secured by screwing the nut K partially up and then drawing the bolt back until said nut comes in contact with the lug F'; the bolt L is then turned, by means of a wrench or other power applied to its head O, the nut K being held by projection J until the whole is tightly screwed up, when, as will be readily seen, the nut K cannot be turned.

The rubber packing H is then compressed, by means of the set-screw I and loose plate C, until it presses with any desired force against the thill G, thereby preventing any rattling of the latter and forming a noiseless and secure coupling.

I am aware that rubber packings have been used heretofore in carriage-clips; but I know of no arrangement for compressing said packing after the thill is attached, it being usually necessary to crowd the thill against the packing with great force in order to compress it sufficiently, thus requiring much physical strength to perform the operation of coupling the thills. With my device, however, the operation can be performed by any person with but little exertion, it being only necessary to put the thill in place and compress the rubber by means of the screw I, as above mentioned.

The projection J, which locks the bolt-nut K, is of great utility, and supplies a want long felt in this direction, obviating any difficulty in removing the bolt when the thread becomes rusted, and any danger of losing the nut.

Having thus fully described my invention,

What I claim as new, and desire to secure by Letters Patent, is—

The yoke A, constructed as described, in combination with packing H, band D, and lugs F F', screw I, and loose plate C, substantially as described.

In testimony whereof I have signed my name to this specification in the presence of two subscribing witnesses.

DANIEL A. JOHNSON.

Witnesses:
CARROLL D. WRIGHT,
CHARLES F. BROWN.